United States Patent
Chul

(10) Patent No.: US 7,362,830 B2
(45) Date of Patent: Apr. 22, 2008

(54) SMART ANTENNA SYSTEM AND METHOD

(75) Inventor: Ihm Bin Chul, Anyang-si (KR)

(73) Assignee: LG Electronics Inc., Seoul (KR)

( * ) Notice: Subject to any disclaimer, the term of this patent is extended or adjusted under 35 U.S.C. 154(b) by 750 days.

(21) Appl. No.: 10/747,083

(22) Filed: Dec. 30, 2003

(65) Prior Publication Data

US 2004/0228420 A1   Nov. 18, 2004

(30) Foreign Application Priority Data

Dec. 31, 2002 (KR) .................. 10-2002-0088007
Jan. 15, 2003 (KR) .................. 10-2003-0002741

(51) Int. Cl.
*H04B 1/10* (2006.01)
(52) U.S. Cl. ............................ 375/347
(58) Field of Classification Search ............ 375/347, 375/316, 346
See application file for complete search history.

(56) References Cited

U.S. PATENT DOCUMENTS 5,524,023 A * 6/1996 Tsujimoto .............. 375/232
6,091,361 A * 7/2000 Davis et al. ............ 342/378
6,934,323 B2 * 8/2005 Hara ..................... 375/152
6,934,563 B2 * 8/2005 Raghothaman et al. .. 455/562.1
6,950,457 B2 * 9/2005 Choi ..................... 375/148

FOREIGN PATENT DOCUMENTS

CN    1334978 A    2/2006

OTHER PUBLICATIONS

Hongfeng, Qin, et al., "An Array Calibration Method for Amplitude and Phase Errors Based on the Subspace Approaches," College of Marine Engineering, Northwestern Polytechnical University, Xi'an, Computer Engineering and Application, vol. 19, pp. 55-57, 2001.
Chinese Office Action dated Jun. 23, 2006.

* cited by examiner

*Primary Examiner*—Kevin Burd
(74) *Attorney, Agent, or Firm*—KED & Associates, LLP

(57) ABSTRACT

Disclosed is a smart antenna system and method. The present invention uses a gradient value closer to a true gradient in weight estimation using the correlation matrix having both of the Hermitian and Toeplitz properties, thereby shortening a convergence speed of the algorithm of estimating the weight.

23 Claims, 5 Drawing Sheets

SMART ANTENNA SYSTEM AND METHOD

This application claims the benefit of the Korean Applications No. P2002-88007 filed on Dec. 31, 2002 and No. P2003-002741 filed on Jan. 15, 2003, which is hereby incorporated by reference.

BACKGROUND OF THE INVENTION

1. Field of the Invention

The present invention relates to a communication system, and more particularly, to a smart antenna system and method.

2. Discussion of the Related Art

Generally, a scheme of maximizing SINR (signal to interface and noise ratio) is frequently used for calculating a weight vector of a smart antenna.

The scheme ultimately intends to improve both communication quality and capacity through a weight vector of an antenna for maximizing SINR.

A gradient may be usable for calculating the weight of the smart antenna.

In a process of finding the gradient, a correlation matrix of a reception signal is needed.

However, the related art correlation matrix satisfies a property of Hermitian matrix only.

SUMMARY OF THE INVENTION

Accordingly, the present invention is directed to a smart antenna system and method that substantially obviates one or more problems due to limitations and disadvantages of the related art.

An object of the present invention is to provide a smart antenna system and method.

Another object of the present invention is to provide a smart antenna system and method using the same, in which a gradient value in the vicinity of a true gradient is used in estimating the weight vector using a correlation matrix having a property of Toeplitz matrix as well as a property of Hermitian matrix.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method using a smart antenna system according to the present invention includes the steps of separating at least one reception signal vector $x(k)$ into a signal component $x_s(k)[=As(k)]$ and an interference/noise component $x_v(k)[=v(k)]$, calculating correlation matrices having Hermitian Toeplitz matrix property, calculating a gradient vector $g(k)$ for a weight vector $w(k)$ maximizing a reception signal to interface and noise ratio (SINR) of a signal vector $y(k)$, and updating the weight vector using the calculated gradient vector.

In another aspect of the present invention, a smart antenna system includes a weight vector generator equipped with an adaptive algorithm for updating a weight vector, a beamforming module forming a beam pattern of antenna elements using the updated weight vector, and an adder adding values of the antenna elements to output a signal vector $y(k)$, wherein the adaptive algorithm comprises the steps of separating at least one reception signal vector $x(k)$ into a signal component $x_s(k)[=As(k)]$ and an interference/noise component $x_v(k)[=v(k)]$, calculating correlation matrices having Hermitian Toeplitz matrix property, calculating a gradient vector $g(k)$ for a weight vector $w(k)$ maximizing a reception signal to interface and noise ratio (SINR) of the signal vector $y(k)$ using the correlation matrices, and updating the weight vector using the calculated gradient vector.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, variables used for the description of the present invention are defined as follows.

$s(k)$: transmission signal $N$: antenna element count $v(k) \in C^N$ $A$: vector including a radio channel coefficient and an antenna gain $x(k)$: $As(k)+v(k)$ $w(k)$=smart antenna weight vector $y(k)=W^H(k)*x(k)=W^H(k)As(k)+W^H(k)v(k)$: result signal As an adaptive algorithm for finding a weight of a smart antenna, there are several methods such as LMS (least mean square), RLS (recursive least square), CMA (constant modulus algorithm), MSINR (maximum signal to interference and noise ratio), etc. Such methods bring to a conclusion of solving a generalized eigenvalue problem.

Specifically, like MSINR, the method of finding a weight maximizing SINR results in solving a generalized eigenvalue problem or uses gradient.

In calculating a corresponding correlation matrix, the present invention enables the corresponding correlation matrix to have the property of Hermitian Toeplitz matrix.

Moreover, in the present invention, Fast Fourier Transformation (FFT) is appled to weight update using the Hermitian Toeplitz matrix property of the correlation matrix.

A method of calculating a weight to maximize SINR (signal to interface and noise ratio) of a result signal is explained as follows for example.

Figure 1:
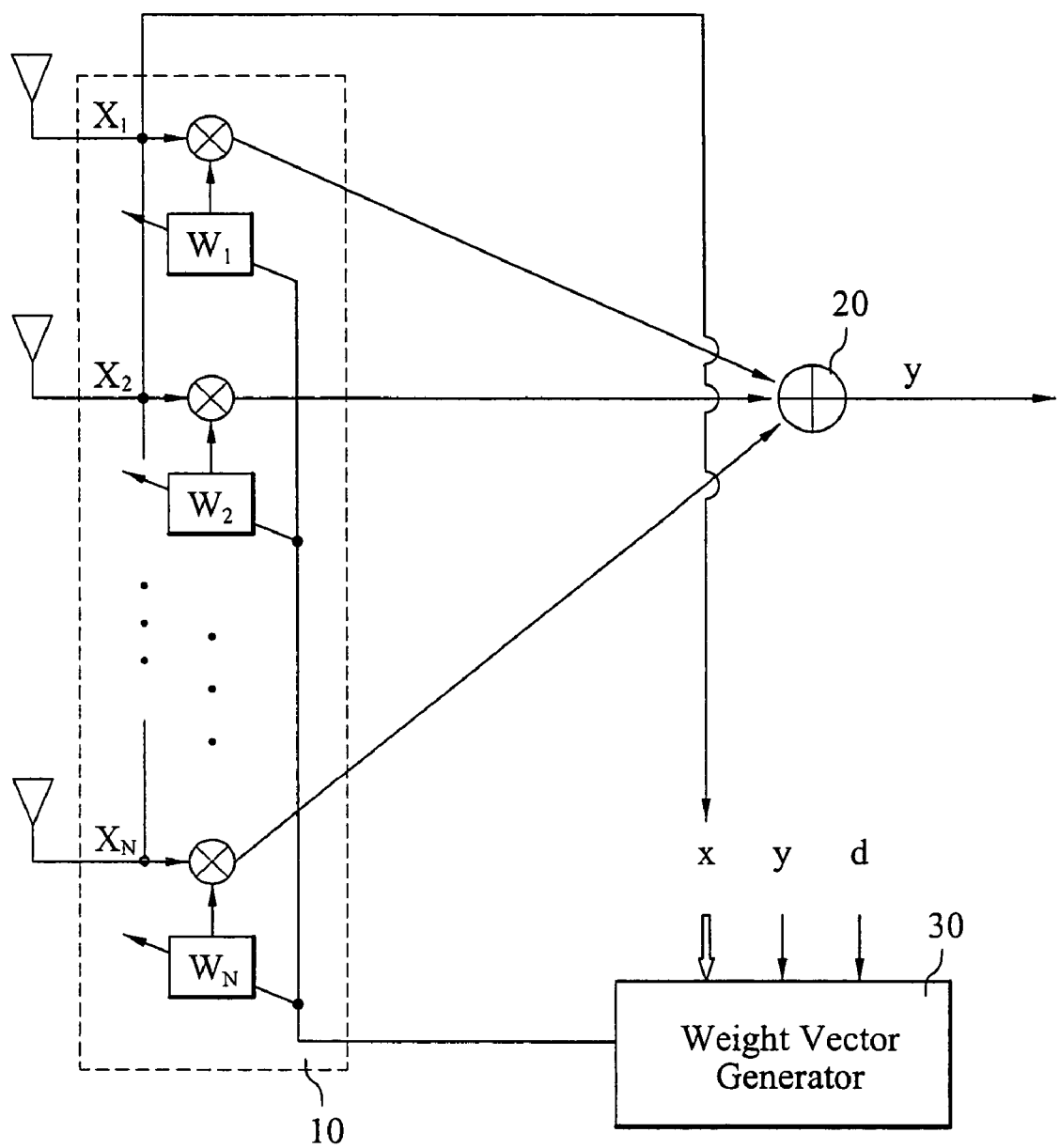
FIG. 1 is a block diagram of a receiver of a smart antenna according to the present invention.

FIG. 1 is a block diagram of a receiver of a smart antenna according to the present invention, in which elements of the smart antenna are array antennas arranged at equal distance from each other.

Referring to FIG. 1, a receiver of a smart antenna estimates a weight to update weight vectors of the respective antenna elements. Namely, the receiver of the smart antenna includes a weight vector generator 30 equipped with an adaptive algorithm for updating a previous weight vector, a beam-forming module 10 forming a beam pattern of the antenna elements using an updated value of the weight vector, and an adder 20 to add the result values.

The weight vector generator 30 is equipped with the adaptive algorithm performing a weight estimating procedure that will be explained through FIG. 2 and FIG. 3, and performs the following operations.

First of all, a newly inputted reception signal vector is separated into a signal component and an interference/noise component. And, correlation matrices having Hermitian Toeplitz matrix property are calculated using the two separated components.

A gradient vector for the weight vector maximizing a SINR (signal to interface and noise ratio) of a result signal, is then calculated.

And, the previous weight vector is updated using the calculated gradient vector.

In this case, the weight vector generator 30 updates the weight using a reception signal vector x, an output signal vector of the adder 20, and a target value d.

The beam-forming module 10 forms the beam pattern of the antenna elements using the weight vector updated value outputted from the weight vector generator 30.

Finally, the adder 20 adds the values of the antenna elements to output, and an output terminal of the adder 20 is connected to the weight vector generator 30 to provide an updated weight vector.

Figure 2:
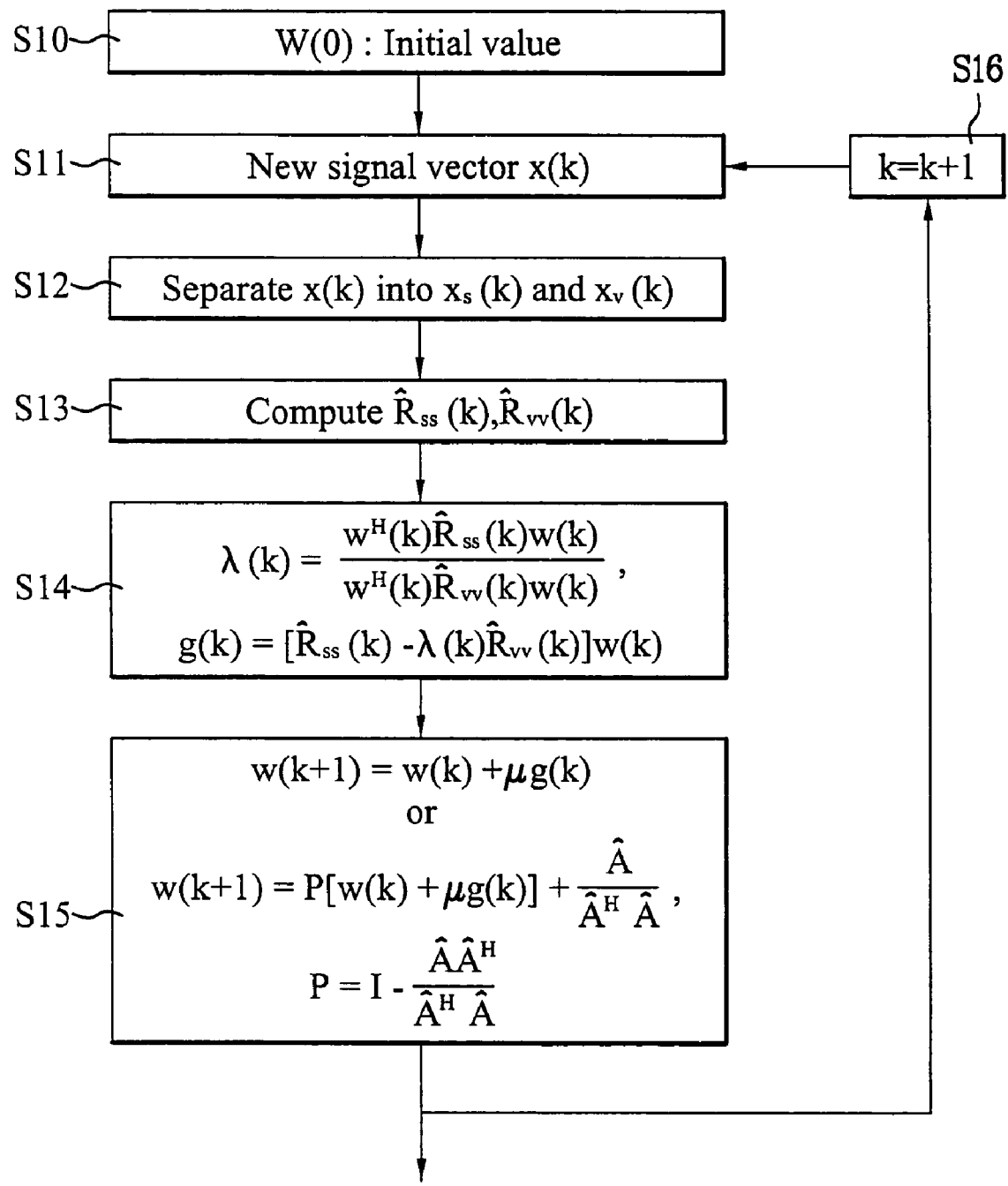
FIG. 2 is a flowchart of a procedure of updating a weight vector according to a first embodiment of the present invention.

FIG. 2 is a flowchart of a procedure of updating a weight vector according to a first embodiment of the present invention.

Referring to FIG. 2, an initial value of a weight vector is w(0) (S10). And, a new reception signal vector is x(k) (S11). In this case, the reception signal vector x(k) is extracted by sampling. Of course, reception signal vectors are extracted by sampling in the following embodiments of the present invention.

And, the reception signal vector x(k) is separated into $x_s(k)[=As(k)]$ and $x_v(k)[=v(k)]$ (S12). Namely, a newly inputted reception signal vector x(k) is separated into a signal component $x_s(k)[=As(k)]$ and an interference/noise component $x_v(k)[=v(k)]$. In this case, 'A' used for the signal component is a vector including antenna gains of the respective elements constructing a smart antenna.

For instance, in the reception signal vector x(k) of CDMA (code division multiple access) system, $x_s(k)[=As(k)]$ and $x_v(k)[=v(k)]$ are regarded as post-despreading and pre-despreading signals, respectively. Hence, for the reception signal vector x(k), $x_s(k)[=As(k)]$ and $x_v(k)[=v(k)]$ are pre-despreading and post-despreading signal components, respectively.

Correlation matrices are found by Equation 1 and Equation 2 using the separated $x_s(k)[=As(k)]$ and $x_v(k)[=v(k)]$ (S13).

$$\hat{R}_{ss}(k) = \frac{(k-1)\hat{R}_{ss}(k-1) + \bar{R}_{ss}(k)}{k} \quad \text{[Equation 1]}$$

$$\hat{R}_{vv}(k) = \frac{(k-1)\hat{R}_{vv}(k-1) + \bar{R}_{vv}(k)}{k} \quad \text{[Equation 2]}$$

$\bar{R}_{ss}(k)$ and $\bar{R}_{vv}(k)$ are shown in Equation 3 and Equation 4, respectively.

$$\bar{R}_{ss}(k) = \begin{bmatrix} \hat{r}_{s,0}(k) & \hat{r}_{s,1}(k) & \dots & \hat{r}_{s,N-1}(k) \\ \hat{r}_{s,1}^*(k) & \hat{r}_{s,0}(k) & \dots & \hat{r}_{s,N-2}(k) \\ \vdots & \vdots & \ddots & \vdots \\ \hat{r}_{s,N-1}^*(k) & \hat{r}_{s,N-2}^*(k) & \dots & \hat{r}_{s,0}(k) \end{bmatrix} \quad \text{[Equation 3]}$$

$$\bar{R}_{vv}(k) = \begin{bmatrix} \hat{r}_{v,0}(k) & \hat{r}_{v,1}(k) & \dots & \hat{r}_{v,N-1}(k) \\ \hat{r}_{v,1}^*(k) & \hat{r}_{v,0}(k) & \dots & \hat{r}_{v,N-2}(k) \\ \vdots & \vdots & \ddots & \vdots \\ \hat{r}_{v,N-1}^*(k) & \hat{r}_{v,N-2}^*(k) & \dots & \hat{r}_{v,0}(k) \end{bmatrix} \quad \text{[Equation 4]}$$

$\hat{r}_{s,l}(k)$ and $\hat{r}_{v,l}(k)$ in Equation 3 and Equation 4 are shown in Equation 5 and Equation 6, respectively.

$$\hat{r}_{s,l}(k) = \frac{1}{N-l} \sum_i x_{s,i}(k) x_{s,i+l}^*(k), \, l = 0, 1, \dots, N-1 \quad \text{[Equation 5]}$$

$$\hat{r}_{v,l}(k) = \frac{1}{N-l} \sum_i x_{v,i}(k) x_{v,i+l}^*(k), \, l = 0, 1, \dots, N-1 \quad \text{[Equation 6]}$$

The correlation matrices $\hat{R}_{ss}(k)$ and $\hat{R}_{vv}(k)$ have the Hermitian matrix property and the Toeplitz matrix property. Besides, the correlation matrices are auto-correlation matrices.

Hence, a gradient vector g(k) maximizing SNIR $$\left[ \lambda(k) = \frac{w^H(k)\hat{R}_{ss}(k)w(k)}{w^H(k)\hat{R}_{vv}(k)w(k)} \right]$$

of a result signal y(k) is calculated (S14), in which the gradient vector g(k) is a vector used in calculating a weight vector w(k). And, a result signal y(k) is an output value of the adder 20 in FIG. 1.

The calculated g(k) is expressed in Equation 7.

$$g(k) = [\hat{R}_{ss}(k) - \lambda \hat{R}_{vv}(k)]w(k) \quad \text{[Equation 7]}$$

Consequently, the weight vector generator 30 updates the previous weight vector w(k), as shown in Equation 8, using the gradient vector g(k). And, a current weight vector is w(k+1).

$$w(k+1) = w(k) + \mu g(k) \quad \text{[Equation 8]}$$

In Equation 8, μ is an adaptive coefficient for adjusting an updated amount.

If the coefficient A of $x_s(k)(=As(k))$ is estimable, i.e., if it is able to estimate 'A' using a pilot channel in the CDMA system, a constrained update expression, as shown in Equation 9, can be attained (S15).

$$w(k+1)=P[w(k)+\mu g(k)]+\hat{A}/\hat{A}^H\hat{A} \quad \text{[Equation 9]}$$

And, 'P' is defined as Equation 10.

$$P = I - \frac{\hat{A}\hat{A}^H}{\hat{A}^H\hat{A}} \quad \text{[Equation 10]}$$

Equation 10 satisfies $W^H(k)\hat{A}=1, \forall k$. In Equation 10, 'I' indicates an identity matrix.

Figure 3:
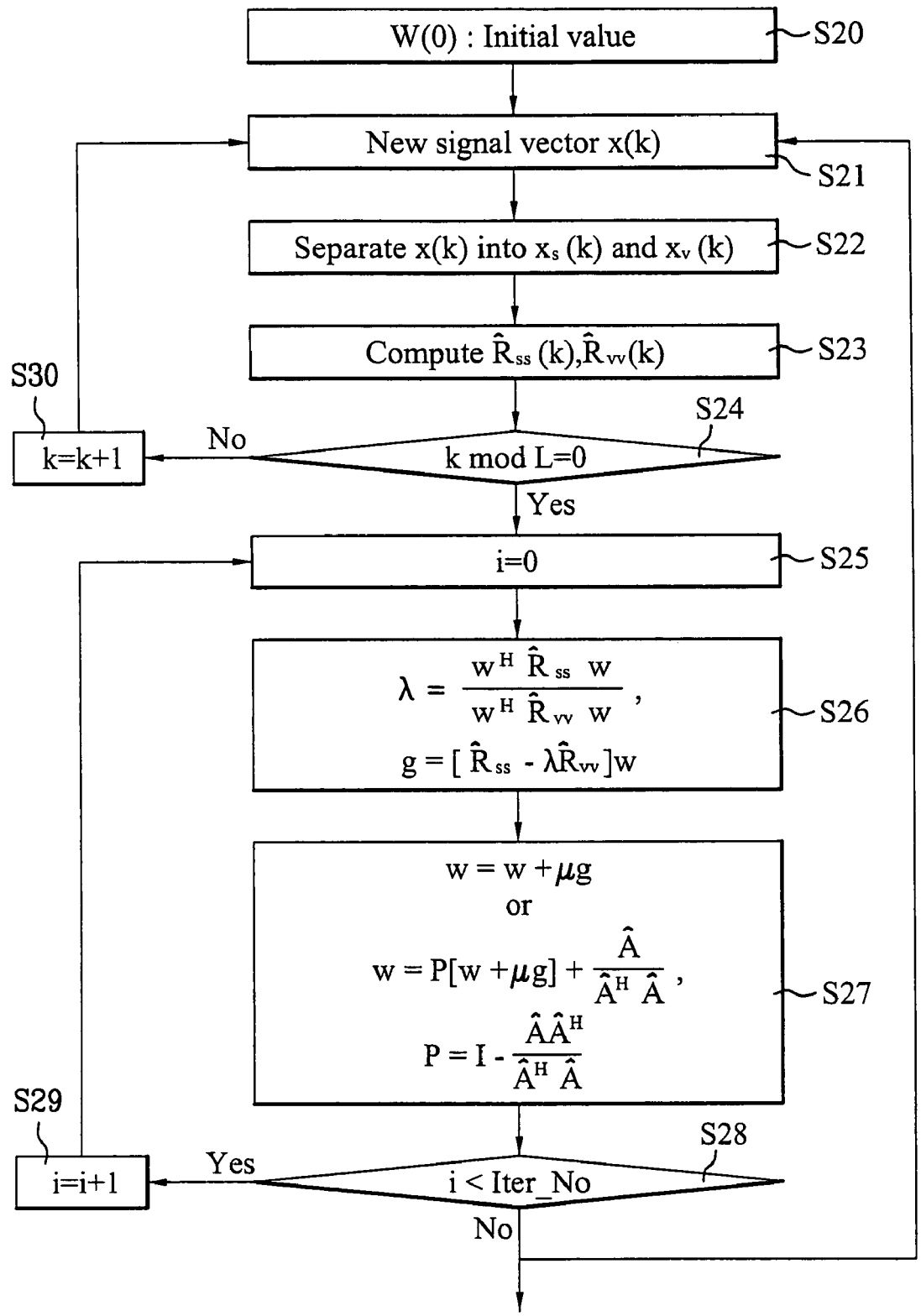
FIG. 3 is a flowchart of a procedure of updating a weight vector according to a second embodiment of the present invention.

FIG. 3 is a flowchart of a procedure of updating a weight vector according to a third embodiment of the present invention.

In the third embodiment of the present invention, the weight vector generator 30 accumulates correlation matrices calculated from the reception signal vector by a sampling interval and/or for a predetermined time to calculate a gradient vector. Specifically, the weight vector generator 30 does not update the weight each time data is inputted. Instead, the weight vector generator 30 calculates to accumulate the correlation matrices several times from the received signals for a predetermined time (e.g., 1 slot or 1 frame) and then repeats updating operations several times using the accumulated correlation matrices to update the weight.

Referring to FIG. 3, an initial value of a weight vector is w(1) when k=1 (S10). And, a new reception signal vector is x(k) (S21).

And, the reception signal vector x(k) is separated into $x_s(k)[=As(k)]$ and $x_v(k)[=v(k)]$ (S22). Namely, a newly inputted reception signal vector x(k) is separated into a signal component $x_s(k)[=As(k)]$ and an interference/noise component $x_v(k)[=v(k)]$. In this case, 'A' used for the signal component is a vector including antenna gains of the respective elements constructing a smart antenna.

For instance, in the reception signal vector x(k) of CDMA (code division multiple access) system, $x_s(k)[=As(k)]$ and $x_v(k)[=v(k)]$ are regarded as post-despreading and pre-despreading signals, respectively.

Correlation matrices are found by Equation 1 and Equation 2 using the separated $x_s(k)[=As(k)]$ and $x_v(k)[=v(k)]$ (S23).

In this case, until 'k mod L' becomes '0', the previous steps S21 to S23 are repeated (S24). 'mod' indicates a modular operation, and the modular operation outputs a remainder in case of dividing 'k' by 'L'.

Since correlation matrices for a signal received for a predetermined time (e.g., 1 slot or 1 frame) are calculated in the above operation, 'L' indicates the predetermined time such as 1 slot or 1 frame.

Hence, the correlation matrices, which are accumulated until 'k mod L' becomes '0', are used in calculating the following gradient vector 'g'. Namely, the gradient vector g maximizing SNIR $$\left[\lambda = \frac{w^H\hat{R}_{ss}w}{w^H\hat{R}_{vv}w}\right]$$

of a result signal y(k) is calculated (S26), in which the gradient vector 'g' is a vector used in calculating a weight vector w.

The gradient vector 'g' is expressed in Equation 11.

$$g=[\hat{R}_{ss}-\lambda\hat{R}_{vv}]w \quad \text{[Equation 11]}$$

The weight vector generator 30 updates the previous weight vector w, as shown in Equation 12, using the gradient vector g of Equation 11 (S27). Such an update of the weight vector is performed as many as a previously set count (S28). 'Iter_No' in FIG. 3 indicates an update count of the previously set weight vector $$w(k+1)=w(k)+\mu g(k) \quad \text{[Equation 12]}$$

In Equation 12, μ is an adaptive coefficient for adjusting the updated amount.

If the coefficient A of $x_s(k)(=As(k))$ is estimatable, i.e., if it is able to estimate 'A' using a pilot channel in the CDMA system, a constrained update expression, as shown in Equation 13, can be attained (S26).

$$w(k+1)=P[w(k)+\mu g(k)]+\hat{A}/\hat{A}^H\hat{A} \quad \text{[Equation 13]}$$

And, 'P' is defined as in Equation 10.

Different applications for the method of calculating a weight to maximize signal to interference and noise ratio (SINR) of a result signal are explained in the following. Namely, a method resulting in solving the generalized eigenvalue problem is explained as follows.

A generalized eigenvalue problem is expressed by Equation 14.

$$R_{ss}w=\lambda R_{vv}w \quad \text{[Equation 14]}$$

In this case, $R_{ss}$ and $R_{vv}$ are a correlation matrix for a signal component of a reception signal and a correlation matrix for a interference and noise component, respectively. 'w' is a weight of an antenna. And, 'λ' is a generalized eigenvalue.

In order to solve Equation 14, the present invention applies Fast Fourier Transformation (FFT) thereto. Specifically, the present invention includes the following logical configuration for the third to fifth embodiments of the present invention. Namely, the weight vector generator 30, which is equipped with the adaptive algorithm for updating the previous weight vector in the beamformer of the smart antenna, includes FFT computation blocks performing Equation 15 and Equation 16, respectively, an eigenvalue computing block performing a generalized eigenvalue by Equation 17, and an update block updating a weight $W_F$, which is computed by applying Fast Fourier Transformation (FFT) thereto, by Equation 18.

$$w_F = FFT \text{ of } \begin{bmatrix} w \\ o \end{bmatrix}, \quad \text{[Equation 15]}$$

where 'O' is a zero vector of N×1.

$$\hat{R}_{ss}^F = FFT \text{ of } \begin{vmatrix} \hat{r}_{s,0} \\ \hat{r}_{s,1} \\ \vdots \\ \hat{r}_{s,N-1} \\ 0 \\ \hat{r}_{s,\hat{N}-1} \\ \vdots \\ \hat{r}_{s,1} \end{vmatrix}, \quad \hat{R}_{vv}^F = FFT \text{ of } \begin{vmatrix} \hat{r}_{v,0} \\ \hat{r}_{v,1} \\ \vdots \\ \hat{r}_{v,N-1} \\ 0 \\ \hat{r}_{v,\hat{N}-1} \\ \vdots \\ \hat{r}_{v,1} \end{vmatrix}$$ [Equation 16]

$$\lambda = \frac{w_F \otimes \hat{R}_{ss}^F \otimes w_F}{w_F \otimes \hat{R}_{vv}^F \otimes w_F}$$ [Equation 17]

$$w_F^{new} = w_F^{old} + \mu(\hat{R}_{ss}^F - \lambda \hat{R}_{vv}^F) \hat{\times} w_F^{old}$$ [Equation 18]

Figure 4:
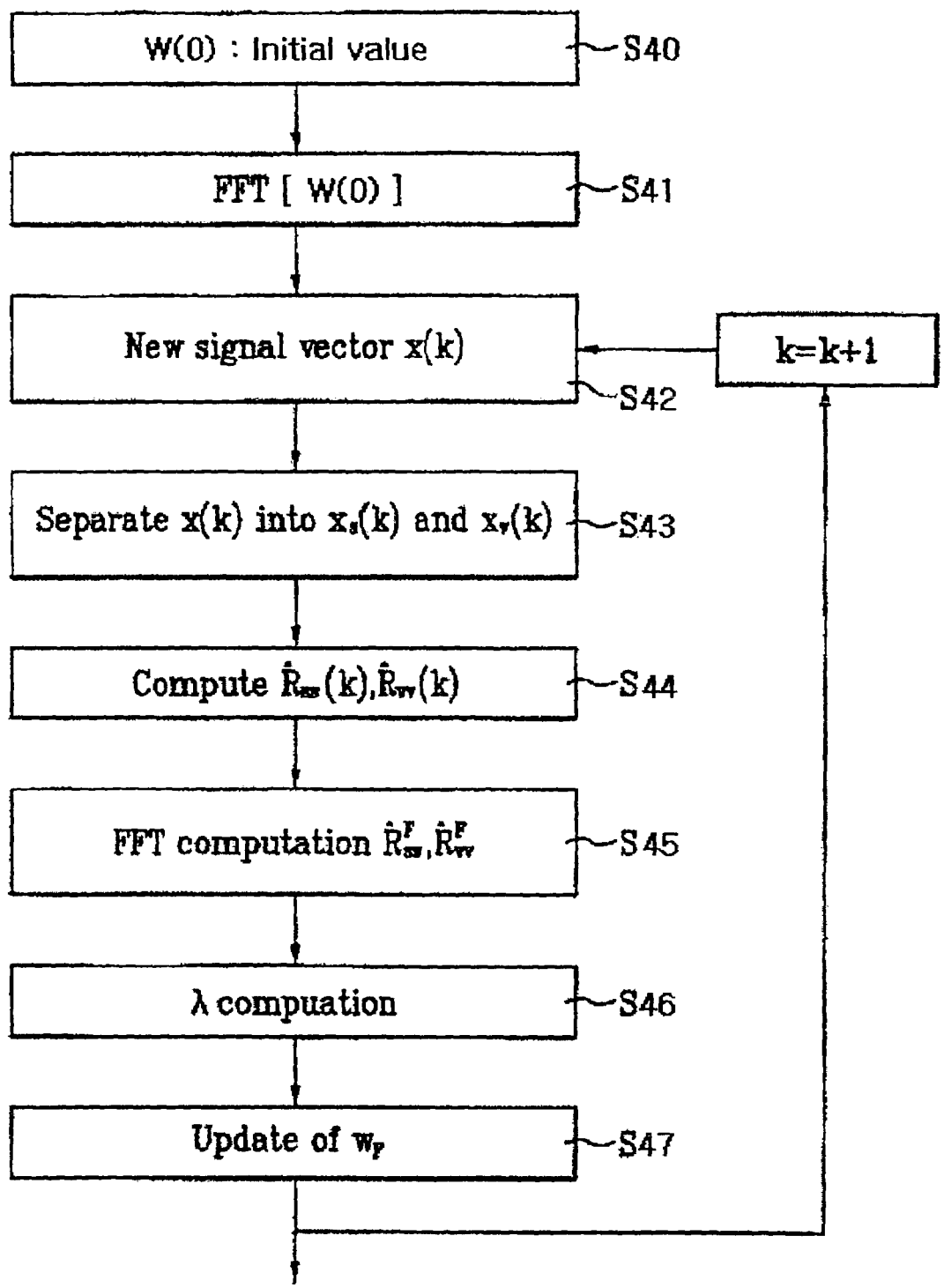
FIG. 4 is a flowchart of a procedure of updating a weight vector according to a third embodiment of the present invention.

FIG. 4 is a flowchart of a procedure of updating a weight vector according to a third embodiment of the present invention.

Referring to FIG. 4, an initial value of a weight vector is w(0) (S40). $W_F$ is calculated by performing Fast Fourier Transformation (FFT) by Equation 15 on the initial value w(0) of the weight vector (S41).

A new reception signal vector is x(k) (S42). And, the reception signal vector x(k) is separated into $x_s(k)[=As(k)]$ and $x_v(k)[=v(k)]$ (S43). Namely, a newly inputted reception signal vector x(k) of pre-correlation is separated into a signal component $x_s(k)[=As(k)]$ and an interference/noise component $x_v(k)[=v(k)]$. In this case, 'A' used for the signal component is a vector including antenna gains of the respective elements constructing a smart antenna.

For instance, in the CDMA (code division multiple access) system, $x_s(k)[=As(k)]$ and $x_v(k)[=v(k)]$ are regarded as post-despreading and pre-despreading signals, respectively.

Correlation matrices are found by Equation 1 and Equation 2 using the separated $x_s(k)[=As(k)]$ and $x_v(k)[=v(k)]$ (S44).

$R_{ss}(k)$ and $R_{vv}(k)$ are shown in Equation 3 and Equation 4, respectively. Moreover, $\hat{r}_{s,l}(k)$ and $\hat{r}_{v,l}(k)$ in Equation 3 and Equation 4 are shown in Equation 5 and Equation 6, respectively.

By calculations of Equation 1 to Equation 6, the correlation matrices $R_{ss}(k)$ and $R_{vv}(k)$ have the Hermitian matrix property and the Toeplitz matrix property. Besides, the correlation matrices are auto-correlation matrices.

Subsequently, by performing Fast Fourier Transformation on the calculated correlation matrices, $\hat{R}_{ss}^F$ and $\hat{R}_{vv}^F$ are computed using Equation 16 (S45).

An eigenvalue $\lambda$ of Equation 17 is calculated using the result values ($W_F$, $\hat{R}_{ss}^F$, $\hat{R}_{vv}^F$) of Fast Fourier Transformation (S46).

The operator in Equation 17 is defined by Equation 19.

$$\begin{bmatrix} x_1 \\ x_2 \\ \vdots \\ x_N \end{bmatrix} \otimes \begin{bmatrix} y_1 \\ y_2 \\ \vdots \\ y_N \end{bmatrix} = \begin{bmatrix} x_1 y_1 \\ x_2 y_2 \\ \vdots \\ x_N y_N \end{bmatrix}$$

Therefore, the weight vector generator 30 updates the previous Fourier-transformed weight vector $W_F$ as shown in Equation 18 (S47).

In Equation 18, μ is an adaptive coefficient for adjusting the updated amount.

In Equation 18 that is a generalized expression, the weight vector calculated through the steps of the third embodiment of the present invention is an old value. The above steps are repeated to find a new weight vector using the old value.

Figure 5:
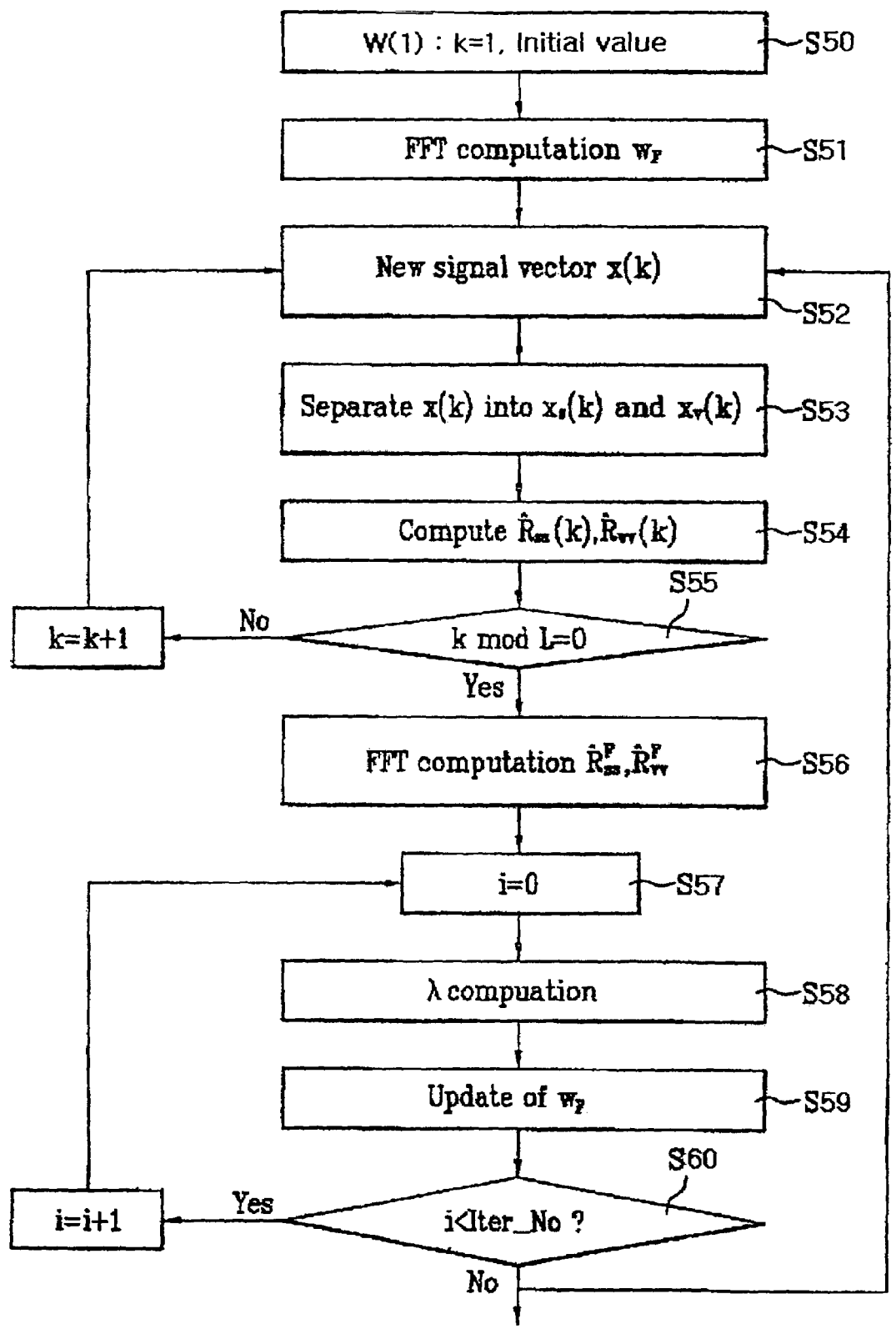
FIG. 5 is a flowchart of a procedure of updating a weight vector according to a fourth embodiment of the present invention.

FIG. 5 is a flowchart of a procedure of updating a weight vector according to a fourth embodiment of the present invention.

In a fourth embodiment of the present invention, the weight vector generator 30 accumulates the correlation matrix calculated from a reception signal vector for a sampling interval and/or a predetermined time to compute the generalized eigenvalue. Specifically, the weight vector generator 30 does not update the weight value each time data is inputted. Instead, the weight vector generator 30 calculates to accumulate several times the correlation matrices from signals received for a predetermined time (e.g., 1 slot or 1 frame) and then repeats update operations several times using the accumulated correlation matrices, thereby updating the weight.

Referring to FIG. 5, an initial value of a weight vector is w(1) if k=1 (S50). $W_F$ is calculated by performing Fast Fourier Transformation (FFT) by Equation 15 on the initial value w(1) of the weight vector (S51).

A new reception signal vector is x(k) (S52). And, the reception signal vector x(k) is separated into $x_s(k)[=As(k)]$ and $x_v(k)[=v(k)]$ (S53). Namely, a newly inputted reception signal vector x(k) is separated into a signal component $x_s(k)[=As(k)]$ and an interference/noise component $x_v(k)[=v(k)]$. In this case, 'A' used for the signal component is a vector including antenna gains of the respective elements constructing a smart antenna.

For instance, in the CDMA (code division multiple access) system, $x_s(k)[=As(k)]$ and $x_v(k)[=v(k)]$ are regarded as post-despreading and pre-despreading signals, respectively.

Correlation matrices are found by Equation 1 and Equation 2 using the separated $x_s(k)[=As(k)]$ and $x_v(k)[=v(k)]$ (S54).

In this case, until 'k mod L' becomes '0', the previous steps S52 to S54 are repeated (S55). 'mod' indicates a modular operation, and the modular operation outputs a remainder in case of dividing 'k' by 'L'.

Since correlation matrices for signals received for a predetermined time (e.g., 1 slot or 1 frame) are calculated in the above operation, 'L' indicates the predetermined time such as 1 slot or 1 frame.

Hence, the correlation matrices, which will be used for Fast Fourier Transformation (FFT), are accumulated until 'k mod L' becomes '0'.

Subsequently, by performing Fast Fourier Transformation on the accumulated correlation matrices, $\hat{R}_{ss}^F$ and $\hat{R}_{vv}^F$ are computed using Equation 16 (S56).

An eigenvalue $\lambda$ of Equation 17 is calculated using the result values ($W_F$, $\hat{R}_{ss}^F$, $\hat{R}_{vv}^F$) of Fast Fourier Transformation (S58).

The operator in Equation 17 is defined by Equation 19.

Therefore, the weight vector generator 30 updates the previous Fourier-transformed weight vector $W_F$ as shown in Equation 18 (S59). Such an update of the weight vector is repeated as many as a previously set count (S60). In FIG. 5, 'Iter_No' indicates a previously set update count of the weight vector.

In Equation 18, μ is an adaptive coefficient for adjusting the updated amount.

Meanwhile, in another preferred embodiment according to the present invention, in updating the previous Fourier-transformed weight vector $W_F$, a method of calculating the eigenvalue by a simpler computation without using Equation 17 is provided as follows.

The following method is used in calculating the eigenvalue λ in the third and fourth embodiments of the present invention.

First of all, Equation 14 that expresses the generalized eigenvalue problem can be represented by Equation 20.

$$\hat{R}_{ss}^F w_F = \lambda \hat{R}_{vv}^F w_F \quad \text{[Equation 20]}$$

In order to solve Equation 20, the weight vector generator 30 according to the present invention further includes a recursive computation block performing Equation 21.

$$w_F(k+1) = \frac{\left\{\text{diag}(\hat{R}_{vv}^F)\right\}^{-1} \hat{R}_{ss}^F \otimes w_F(k)}{\lambda} \quad \text{[Equation 21]}$$

In Equation 21, 'diag' indicates a diagonal matrix shown in Equation 22.

$$\text{diag}([a_1, a_2, \ldots, a_N]^T) = \begin{bmatrix} a_1 & 0 & \ldots & 0 \\ 0 & a_2 & \ldots & 0 \\ \vdots & \vdots & \ddots & \vdots \\ 0 & 0 & \ldots & a_N \end{bmatrix} \quad \text{[Equation 22]}$$

Hence, the eigenvalue λ can be calculated by Equation 23.

$$\lambda = \frac{\hat{R}_{ss}^F \otimes z}{\hat{R}_{vv}^F \otimes z}, \quad \text{[Equation 23]}$$

$$z = w_F w_F$$

Hence, the previous Fourier-transformed weight vector $W_F$ is updated by using the eigenvalue λ calculated in Equation 23 for Equation 18.

Accordingly, a gradient value closer to a true gradient is used in weight estimation using the correlation matrix having both of the Hermitian and Toeplitz properties, whereby a convergence speed of the algorithm of estimating the weight is shortened.

And, in the constrained update, $W^H \hat{A} = 1, \forall k$ is satisfied so that the constrained update equation is prevented from drifting between numerous solutions.

Moreover, it is unnecessary to convert a problem of the method (MSINR) of calculating the weight to maximize the SINR (signal to interface and noise ratio) of the result signal to the generalized eigenvalue problem, whereby inverse matrix is not needed to reduce the calculation amount greatly.

Furthermore, since the correlation matrix having the Toeplitz matrix property as well as the Hermitian matrix property is used in the weight estimation, it is unnecessary to find all components of the correlation matrix. Namely, the weight is estimated by calculating the first column or row only, whereby overall calculation amount and storage device size are reduced.

Besides, the present invention further uses Fast Fourier Transformation (FFT), thereby reducing a multiplication operation amount of matrix and vector according to an antenna element count (N). Namely, for the multiplication operation amount of matrix and vector, $0(N^2)$ can be replaced by $0(N\log_2 N)$, whereby a computation amount is relatively reduced as the antenna element count (N) increases. Additionally, the memory capacity for storing the matrices is reduced down to 2N from $N^2$.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method using a smart antenna, comprising:
   separating at least one reception signal vector x(k) into a signal component $x_s(k)[=As(k)]$ and an interference/noise component $x_v(k)[=v(k)]$;
   calculating correlation matrices $\hat{R}_{ss}(k)$ of the signal component and $\hat{R}_{vv}(k)$ of the interference/noise component, the correlation matrices having Hermitian and Toeplitz matrix property;
   updating a weight vector of a previous value into a current value using the calculated correlation matrices;
   outputting the updated weight vector; and
   weighting a received signal with the updated weight vector,
   wherein the correlation matrices are $\hat{R}_{ss}(k)$ and $\hat{R}_{vv}(k)$, and wherein $\hat{R}_{ss}(k) = \frac{(k-1)\hat{R}_{ss}(k-1) + \bar{R}_{ss}(k)}{k}$, $\hat{R}_{vv}(k) = \frac{(k-1)\hat{R}_{vv}(k-1) + \bar{R}_{vv}(k)}{k}$, $\bar{R}_{ss}(k) = \begin{bmatrix} \hat{r}_{s,0}(k) & \hat{r}_{s,1}(k) & \ldots & \hat{r}_{s,N-1}(k) \\ \hat{r}_{s,1}^*(k) & \hat{r}_{s,0}(k) & \ldots & \hat{r}_{s,N-2}(k) \\ \vdots & \vdots & \ddots & \vdots \\ \hat{r}_{s,N-1}^* & \hat{r}_{s,N-2}^* & \ldots & \hat{r}_{s,0}(k) \end{bmatrix}$, $\bar{R}_{vv}(k) = \begin{bmatrix} \hat{r}_{v,0}(k) & \hat{r}_{v,1}(k) & \ldots & \hat{r}_{v,N-1}(k) \\ \hat{r}_{v,1}^*(k) & \hat{r}_{v,0}(k) & \ldots & \hat{r}_{v,N-2}(k) \\ \vdots & \vdots & \ddots & \vdots \\ \hat{r}_{v,N-1}^*(k) & \hat{r}_{v,N-2}^*(k) & \ldots & \hat{r}_{v,0}(k) \end{bmatrix}$, $\hat{r}_{s,l}(k) = \frac{1}{N-l} \sum_i x_{s,i}(k) x_{s,i+l}^*(k), l = 0, 1, \ldots, N-1$, and $\hat{r}_{v,l}(k) = \frac{1}{N-l} \sum_i x_{v,i}(k) x_{v,i+l}^*(k), l = 0, 1, \ldots, N-1$.

2. The method of claim 1, wherein the signal component $x(k)[=As(k)]$ and the interference/noise component $x_v(k)[=v(k)]$ are post-despreading signal component and pre-despreading signal components, respectively.

3. The method of claim 1, wherein the signal component includes antenna gains of respective elements constructing the smart antenna.

4. The method of claim 1, wherein the correlation matrices are auto-correlation matrices.

5. The method of claim 1, further comprising:
calculating a gradient vector g(k) for a weight vector w(k) maximizing a signal to interface and noise ratio (SINR) of a signal vector y(k) using the calculated correlation matrices; and
updating the previous value of the weight vector into the current value using the calculated gradient vector.

6. The method of claim 5, wherein the gradient vector g(k) is expressed as $g(k)=[\hat{R}_{ss}(k)-\lambda\hat{R}_{vv}(k)]w(k)$ using $\hat{R}_{ss}(k)$ and $\hat{R}_{vv}(k)$ where $$\lambda(k) = \frac{w^H(k)\hat{R}_{ss}(k)w(k)}{w^H(k)\hat{R}_{vv}(k)w(k)}.$$

7. The method of claim 5, wherein the reception signal to interface and noise ratio (SINR) is $$\lambda(k) = \frac{w^H(k)\hat{R}_{ss}(k)w(k)}{w^H(k)\hat{R}_{vv}(k)w(k)}$$

using the correlation matrices $\hat{R}_{ss}(k)$ and $\hat{R}_{vv}(k)$.

8. The method of claim 5, wherein an update expression of the weight vector is $w(k+1)=w(k)+\mu g(k)$ where 'μ' is an adaptive coefficient for adjusting an updated amount.

9. The method of claim 5, wherein if a coefficient 'A' of the $x_s(k)(=As(k))$ is estimable, an update expression of the weight vector is $w(k+1)=P[w(k)+\mu g(k)]+\hat{A}/\hat{A}^H\hat{A}$ satisfying $W^H(k)\hat{A}=1$, $\forall k$ where 'μ' is an adaptive coefficient for adjusting an updated amount, $$P = I - \frac{\hat{A}\hat{A}^H}{\hat{A}^H\hat{A}},$$

and 'I' indicates an identity matrix.

10. The method of claim 5, wherein the correlation matrices for the at least one reception signal are accumulated for a data sampling interval and/or a predetermined time to be used for calculating the gradient vector.

11. The method of claim 10, wherein the correlation matrices for the at least one reception signal are accumulated by slot unit.

12. The method of claim 10, wherein the correlation matrices for the at least one reception signal are accumulated by frame unit.

13. The method of claim 1, wherein in case of using the correlation matrix accumulated for a data sampling interval and/or a predetermined time in updating the weight vector, the step of updating the weight vector is repeated several times.

14. The method of claim 1, wherein antenna gains of respective elements constructing the smart antenna are further applied to estimating the weight.

15. A method using a smart antenna system, comprising:
separating at least one reception signal vector x(k) into a signal component $x_s(k)[=As(k)]$ and an interference/noise component $x_v(k)[=v(k)]$;
calculating a first correlation matrix $\hat{R}_{ss}(k)$ of the signal component and a second correlation matrix $\hat{R}_{vv}(k)$ of the interference/noise component, the correlation matrices having Hermitian and Toeplitz matrix property;
performing Fast Fourier Transformation (FFT) on a previous weight vector and the calculated correlation matrices;
calculating an eigenvalue (λ) using the Fast-Fourier-Transformed weight vector ($W_F$) and the Fast-Fourier-Transformed correlation matrices ($\hat{R}_{ss}^F, \hat{R}_{vv}^F$);
updating the previous weight vector into the current value using the calculated eigenvalue, the Fast-Fourier-Transformed weight vector, and the Fast-Fourier-Transformed correlation matrices;
outputting the updated weight vector; and
weighting a received signal with the updated weight vector.

16. The method of claim 15, wherein the Fast-Fourier-Transformed weight vector $(W_F)$ is $w_F = FFT$ of $\begin{bmatrix} w \\ o \end{bmatrix}$, where 'O' is a zero vector of N×1.

17. The method of claim 15, wherein the correlation matrices are $\hat{R}_{ss}(k)$ and $\hat{R}_{vv}(k)$, respectively and wherein if $$\hat{R}_{ss}(k) = \frac{(k-1)\hat{R}_{ss}(k-1)+\overline{R}_{ss}(k)}{k},$$

$$\hat{R}_{vv}(k) = \frac{(k-1)\hat{R}_{vv}(k-1)+\overline{R}_{vv}(k)}{k},$$

$$\overline{R}_{ss}(k) = \begin{bmatrix} \hat{r}_{s,0}(k) & \hat{r}_{s,1}(k) & \cdots & \hat{r}_{s,N-1}(k) \\ \hat{r}_{s,1}^*(k) & \hat{r}_{s,0}(k) & \cdots & \hat{r}_{s,N-2}(k) \\ \vdots & \vdots & \ddots & \vdots \\ \hat{r}_{s,N-1}^* & \hat{r}_{s,N-2}^* & \cdots & \hat{r}_{s,0}(k) \end{bmatrix},$$

$$\overline{R}_{vv}(k) = \begin{bmatrix} \hat{r}_{v,0}(k) & \hat{r}_{v,1}(k) & \cdots & \hat{r}_{v,N-1}(k) \\ \hat{r}_{v,1}^*(k) & \hat{r}_{v,0}(k) & \cdots & \hat{r}_{v,N-2}(k) \\ \vdots & \vdots & \ddots & \vdots \\ \hat{r}_{v,N-1}^*(k) & \hat{r}_{v,N-2}^*(k) & \cdots & \hat{r}_{v,0}(k) \end{bmatrix},$$

$$\hat{r}_{s,l}(k) = \frac{1}{N-l}\sum_i x_{s,i}(k)x_{s,i+l}^*(k), l=0, 1, \ldots, N-1, \text{ and}$$

$$\hat{r}_{v,l}(k) = \frac{1}{N-l}\sum_i x_{v,i}(k)x_{v,i-l}^*(k),$$

l=0, 1, . . . , N−1, the Fast Fourier Transformations of the correlation matrices are $$\hat{R}_{ss}^F = FFT \text{ of } \begin{vmatrix} \hat{r}_{s,0} \\ \hat{r}_{s,1} \\ \vdots \\ \hat{r}_{s,N-1}^* \\ 0 \\ \hat{r}_{s,N-1} \\ \vdots \\ \hat{r}_{s,1} \end{vmatrix} \text{ and } \hat{R}_{vv}^F = FFT \text{ of } \begin{vmatrix} \hat{r}_{v,0} \\ \hat{r}_{v,1}^* \\ \vdots \\ \hat{r}_{v,N-1}^* \\ 0 \\ \hat{r}_{v,N-1} \\ \vdots \\ \hat{r}_{v,1} \end{vmatrix},$$

respectively.

18. The method of claim 15, wherein the eigenvalue ($\lambda$) is $$\lambda = \frac{w_F \otimes \hat{R}_{ss}^F \otimes w_F}{w_F \otimes \hat{R}_{vv}^F \otimes w_F}$$

of an operator is defined as $$\begin{bmatrix} x_1 \\ x_2 \\ \vdots \\ x_N \end{bmatrix} \otimes \begin{bmatrix} y_1 \\ y_2 \\ \vdots \\ y_N \end{bmatrix} = \begin{bmatrix} x_1 y_1 \\ x_2 y_2 \\ \vdots \\ x_N y_N \end{bmatrix}.$$

19. The method of claim 15, wherein an updating equation of the weight vector is $w_F^{new} = w_F^{old} + \mu(\hat{R}_{ss}^F - \lambda \hat{R}_{vv}^F) w_F^{old}$ where $\mu$ is an adaptive coefficient for adjusting the updated amount.

20. The method of claim 15, wherein the correlation matrix for the at least one or more reception signal vectors is accumulated for a data sampling interval and/or a predetermined time and the accumulated correlation matrices are used in the FFT calculation.

21. The method of claim 20, wherein the correlation matrices for the reception signal vectors are accumulated by slot unit.

22. The method of claim 20, wherein the correlation matrices for the reception signal vectors are accumulated by frame unit.

23. The method of claim 15, wherein if a generalized eigenvalue problem for the eigenvalue ($\lambda$) is $\hat{R}_{ss}^F w_F = \lambda \hat{R}_{vv}^F w_F$, the current value is $$w_F(k+1) = \frac{\{\mathrm{diag}(\hat{R}_{vv}^F)\}^{-1} \hat{R}_{ss}^F \otimes w_F(k)}{\lambda}$$

by a recursive computation using a diagonal matrix and the eigenvalue ($\lambda$) is $$\lambda = \frac{\hat{R}_{ss}^F \otimes z}{\hat{R}_{vv}^F \otimes z},$$

$z = w_F w_F$.

* * * * *